Figure 1:
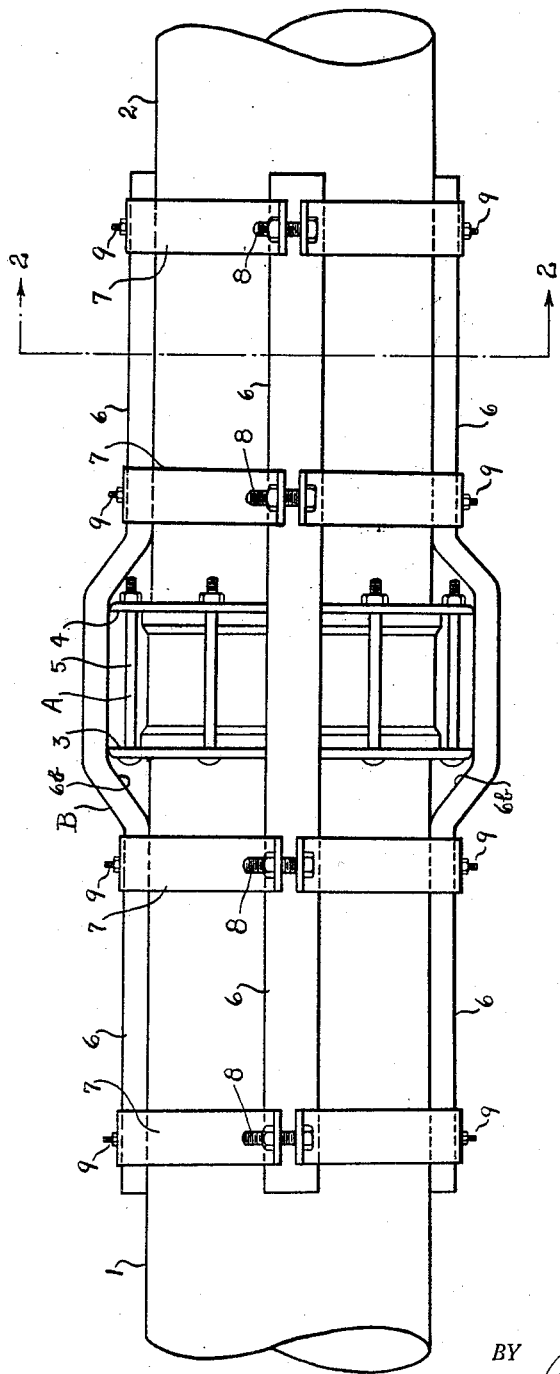

Dec. 20, 1932.  P. D. ELKINS  1,891,874
COUPLING
Filed Feb. 17, 1930  2 Sheets-Sheet 1

Philip D. Elkins
INVENTOR.
BY J. Vincent Martin
ATTORNEY

Dec. 20, 1932.  P. D. ELKINS  1,891,874
COUPLING
Filed Feb. 17, 1930   2 Sheets-Sheet 2
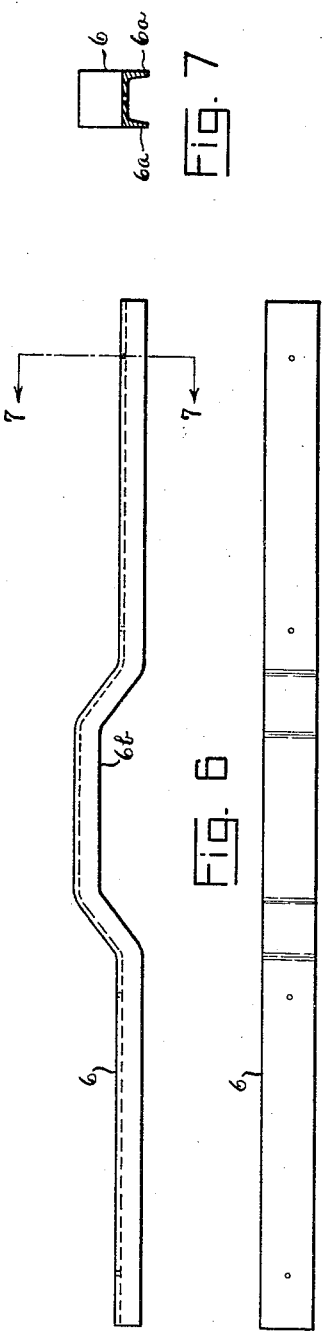
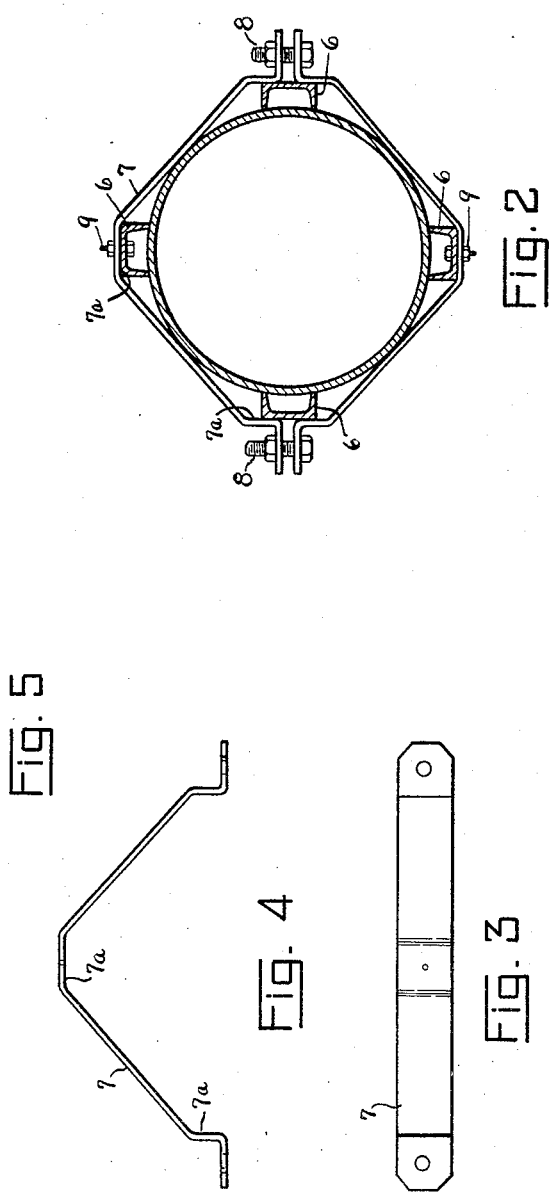
Philip D. Elkins
INVENTOR
BY J. Vincent Martin
ATTORNEY Patented Dec. 20, 1932

1,891,874

UNITED STATES PATENT OFFICE

PHILIP D. ELKINS, OF HOUSTON, TEXAS

COUPLING

Application filed February 17, 1930. Serial No. 428,944.

This invention relates to couplings for rods, pipes, and the like.

It is necessary that relative transverse movement of the meeting ends of fluid conveying pipes be prevented, because such movement breaks the seal between the pipes and therefore permits escape of the fluid to be conveyed. The couplings now used to connect such pipes are defective in that they offer little resistance to such movement. The present invention has for its principal object the provision of a coupling, particularly useful in connection with such pipes, embodying new and improved means to hold the meeting ends thereof transversely as well as longitudinally immovable with respect to each other.

Other objects of the invention will hereinafter appear.

Referring to the accompanying drawings which are illustrative of the preferred embodiment of the invention, Fig. 1 is a side elevation of the coupling applied to connect two pipes; Fig. 2, a vertical section on the line 2—2 of Fig. 1; Figs. 3 and 4 are inside and end views, respectively, of a section of one of the straps; Figs. 5 and 6 are top plan and side elevation views, respectively, of the longitudinal members; and Fig. 7 is a vertical section on the line 7—7 of Fig. 6.

Referring specifically to the drawings, the pipes are indicated at 1 and 2. The coupling A comprises the ring 3 mounted on the pipe 1, the ring 4 mounted on the pipe 2, and the bolts 5 connecting said rings. The coupling A serves principally to prevent longitudinal separation of the meeting ends of the pipes. It is incapable of preventing relative transverse movement of the meeting ends of the pipes when great forces are exerted on the same transversely. Such forces are exerted, for instance, by gravity when a string of coupled pipes is suspended or laid upon an uneven surface.

To hold the pipes in axial alignment when they are subjected to such transverse strains, the preferred embodiment of the invention includes the coupling b comprising a plurality of longitudinally extending members 6 clamped on the pipes by a plurality of straps 7.

The longitudinal members are preferably substantially U-shaped in cross section as shown particularly by Figs. 2 and 7, and are so placed that their arms 6a rest upon the peripheries of the pipes. The middle portion of said longitudinal members is offset as indicated at 6b for the reception of the coupling A referred to. The rings 3 and 4 of coupling A bear against the offset portion 6a of the longitudinal members as shown by Fig. 1. The straps 7 are angular in cross section and have flat corners 7a for the reception of said longitudinal members. They are preferably made in two sections adjustably connected by the bolts 8.

The straps 7 extend about the ends of the longitudinal members 6, and the upper and lower longitudinal members are rigidly connected to said straps by the bolts 9.

The assembly and separation of the parts will be obvious.

The invention is not limited to the preferred embodiments shown nor to the particular use described. Various changes in construction and other uses to which the invention may be put will at once appear to those skilled in the art.

I claim:

1. A coupling comprising a plurality of longitudinally disposed elongated members substantially U-shaped in cross section to form inwardly extending arms, each of said members having an outwardly offset portion between its ends, and a plurality of straps to hold said members in spaced relation, said straps being angular in cross section and having flattened corners for the reception of said members.

2. A coupling having a longitudinally disposed elongated member substantially U-shaped in cross section to form inwardly extending arms, a transversely disposed strap having a flattened corner in which said member fits, and a bolt extending through the body portion of said member and said strap to hold said member in said corner.

3. The combination with a pair of substantially cylindrical objects, each having a ring mounted on one of its ends, of a plurality of elongated members longitudinally disposed on said ends and having inwardly extending arms fitting the peripheries of said ends, and lateral offset portions for the reception of said rings, and a plurality of transversely disposed clamping straps to hold said members on said objects in spaced relation.

4. The combination with a pair of substantially cylindrical objects, each having a ring mounted on one of its ends, and bolts connecting said rings, of a coupling comprising a plurality of elongated members longitudinally disposed on said ends and having inwardly extending arms fitting the peripheries of said ends and laterally offset portions for the reception of said rings and bolts, and a plurality of transversely disposed clamping straps on opposite sides of said offset portions to hold said members on said objects in spaced relation, said straps being angular in cross section and having flattened corners for the reception of said members.

In testimony whereof, I hereunto affix my signature.

PHILIP D. ELKINS.